(12) United States Patent
Stones et al.

(10) Patent No.: US 6,206,162 B1
(45) Date of Patent: *Mar. 27, 2001

(54) DOG CLUTCH MECHANISM

(75) Inventors: Kevin Stones, Bishop Auckland; Martyn Riley, New Castle, both of (GB)

(73) Assignee: Black & Decker, Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,703

(22) Filed: Mar. 3, 1999

(30) Foreign Application Priority Data

Mar. 6, 1998 (GB) .................................. 9804794

(51) Int. Cl.[7] ......................................... B27B 17/00
(52) U.S. Cl. .......................... 192/69.7; 192/93 A
(58) Field of Search ..................... 192/54.5, 93 A, 192/69.2, 69.7, 69.9, 89.21

(56) References Cited

U.S. PATENT DOCUMENTS

| | | | | |
|---|---|---|---|---|
| 1,193,008 | * | 8/1916 | Fuller | 192/89.21 X |
| 1,988,590 | * | 1/1935 | Geiger | 192/89.21 X |
| 2,332,743 | * | 10/1943 | Morris | 192/89.21 X |
| 3,361,165 | | 1/1968 | Irgens | 30/382 |
| 4,352,418 | * | 10/1982 | Teraoka | 192/89.21 X |
| 4,625,406 | | 12/1986 | Fushiya . | |
| 4,782,593 | | 11/1988 | Kieser et al. | 30/382 UX |
| 5,219,049 | * | 6/1993 | Unterborn | 188/156 |
| 5,709,032 | | 1/1998 | Mizutani et al. | 30/382 UX |
| 5,791,057 | | 8/1998 | Nakamura et al. | 30/382 UX |

FOREIGN PATENT DOCUMENTS 0341873    11/1989 (EP) .

* cited by examiner

Primary Examiner—Rodney H. Bonck

(57) ABSTRACT

A dog clutch for a power tool such as a chain saw for engagement and disengagement of the motor from the cutting tool comprising a first gear (32) mounted on and attached to a rotatable spindle (34), a second gear (36) rotatably mounted adjacent the first gear (32), and an engaging mechanisn (38) such as a cam ring. The second gear (36) is rotatably mounted on and axially slidable along the spindle and is biased preferably by a helical spring towards the first gear (32). The engaging mechanism (38) is rotatably mounted adjacent to and preferably about the second gear (36) in an axially slidable manner along the longitudinal axis of the spindle (34). The engaging mechanism (38) is configured so that rotational movement of the engaging mechanism (38) translates into an axial sliding movement. Rotational movement of the engaging mechanism moves the second gear (36) into and out of driving engagement with the first gear (32) depending on the direction of rotation.

10 Claims, 16 Drawing Sheets

DOG CLUTCH MECHANISM

The present invention relates to a clutch mechanism for a power tool and in particular, to a clutch mechanism for a chain saw.

A chain saw comprises a cutting chain which is driven around a chain bar by a motor. The motor can be either an internal combustion engine or an electric motor. The chain saw is supported by an operator in use by two handles, a first rear handle located at the rear of the main body of the chain saw and a second bail handle located on the side of the main body of the chain saw.

However, the operation of a chain saw to cut material can be hazardous. One well known hazard is that generally referred to as "kick back". During use, the moving chain cuts through the material. However, the chain can become snagged or caught on the material thus preventing the chain from moving relative to the material. This results in the chain saw being thrown by the force of the motor trying to drive the chain, upwards towards the head of the operator which is known as "kick back". It is therefore desirable to stop the chain as soon as possible when "kick back" occurs.

Current European safety standards require that the chain on a chain saw has to stop within a pre-determined period when "kick-back" occurs. The stopping process is commonly triggered by the forward pivotal movement of a pivotal handle guard located in front of the bail handle. The handle guard is configured so that the forward pivotal movement of the handle guard interacts with the chain driving mechanism in order to stop the chain. Pivotal movement of the handle guard can be caused by the back of the hand of the operator, holding the bail handle, hitting the handle guard as the chain saw "kicks back". Alternatively, the handle guard can be designed so that it has a sufficient moment of inertia to cause it to pivot forward when the chain saw "kicks back".

Chain saws are commonly constructed so that the chain is driven by the motor via a clutch. When the pivotal handle is pivoted forward due to "kick-back", the movement of the pivotal handle guard interacts with the clutch in order to disengage the clutch allowing the chain to run to a halt due to friction generated between the chain and the chain bar. A known type of such a clutch mechanisms that of a dog clutch. However, known designs of dog clutch are complicated. They are often difficult to machine and therefore expensive to manufacture. Furthermore, they are bulky, taking up substantial and valuable space within the chain saw.

With a large number of such designs of clutch, braking mechanisms are needed in order to assist in the stopping of the chain and therefore reduce the time taken for the chain saw to stop. A common type of brake is that of a band brake. However, the addition of such brakes further complicates the design increasing costs and size.

It is an object of the present invention to provide a simple but reliable design of dog clutch which overcomes or at least mitigates the above problems.

According to a first aspect of the present invention, there is provided a dog clutch for a power tool comprising a first gear mounted on and attached to a rotatable spindle, a second gear rotatably mounted adjacent the first gear, and an engaging mechanism characterised in that the second gear is rotatably mounted on and axially slidable along the spindle and is biased towards the first gear, and the engaging mechanism is rotatably mounted adjacent to the second gear about and axially slidable along the longitudinal axis of the spindle and is configured so that rotational movement of the engaging mechanism translates into an axial sliding movement of the engaging mechanism wherein rotational movement of the engaging mechanism moves the second gear into and out of a driving engagement with the first gear depending on the direction of rotation.

This provides a compact, simple and relatively small design of dog clutch which is reliable in operation. Furthermore, due to its simplicity, the dog clutch is easy and cheap to manufacture. The design provides easy disengagement of the motor and chain, thus allowing the chain to stop quickly. Therefore, additional braking is avoided which keeps the design simple. The design further provides easy engagement and disengagement requiring little physical effort by the user to operate the dog clutch.

Preferably, the engaging mechanism comprises a cam ring having a plurality of cam surfaces which co-operate with corresponding surfaces to translate rotational movement of the cam ring into an axial sliding movement of the cam ring.

Preferably the engaging mechanism is rotatably mounted on the second gear. By having the engaging mechanism and second gear concentrically mounted about the spindle the size of the clutch is further reduced and the design of clutch is further compacted. In addition, it provides a simple and easy way of mounting the engaging mechanism within the dog clutch.

The second gear can be biased towards the first gear by a helical spring.

Preferably the engaging mechanism is mounted in an axially slidable but non-rotatable fashion within a gear actuator which is capable of pivoting about the longitudinal axis of the spindle between a first position where the second gear drivingly engages the first gear and a second position where the second gear is disengaged from the first gear.

By mounting the engaging mechanism within the gear actuator so that it is able to axially slide within the gear actuator, but is unable to rotate relative to the gear actuator, the gear actuator only needs to move in a pivotal motion only to engage or disengage the dog clutch. Therefore, this permits a simple interconnection between the dog clutch and to separate switching mechanisms. Switch mechanisms are able to be connected to the gear actuator so that movement of the switching mechanisms pivotally move the gear actuator to engage or disengage the dog clutch. Furthermore, the design of dog clutch is kept compact by concentrically mounting the gear actuator about the engaging mechanism.

The gear actuator can be biased, for instance, by a helical spring, towards the second position, the biasing force being of a sufficient strength to overcome the biasing force which biases the second gear towards driving engagement with the first gear. This ensures that the dog clutch is biased towards disengagement.

In one particular design the first gear can comprise an outer peripheral surface which meshes with a series of ramped dogs on the second gear, when the second gear drivingly engages the first gear.

The use of ramped dogs on the second gear, allows the gears to continue to rotate relative to each other if the two gears are not aligned, because the ramped dogs are able to slide smoothly until they become aligned with the peripheral surface at which point the ramped dogs will drivingly mesh with the peripheral surface, thus preventing relative rotation movement between gears. This prevents damage to the gears during engagement.

The invention will now be described in relation to the drawings of which:

Figure 1:
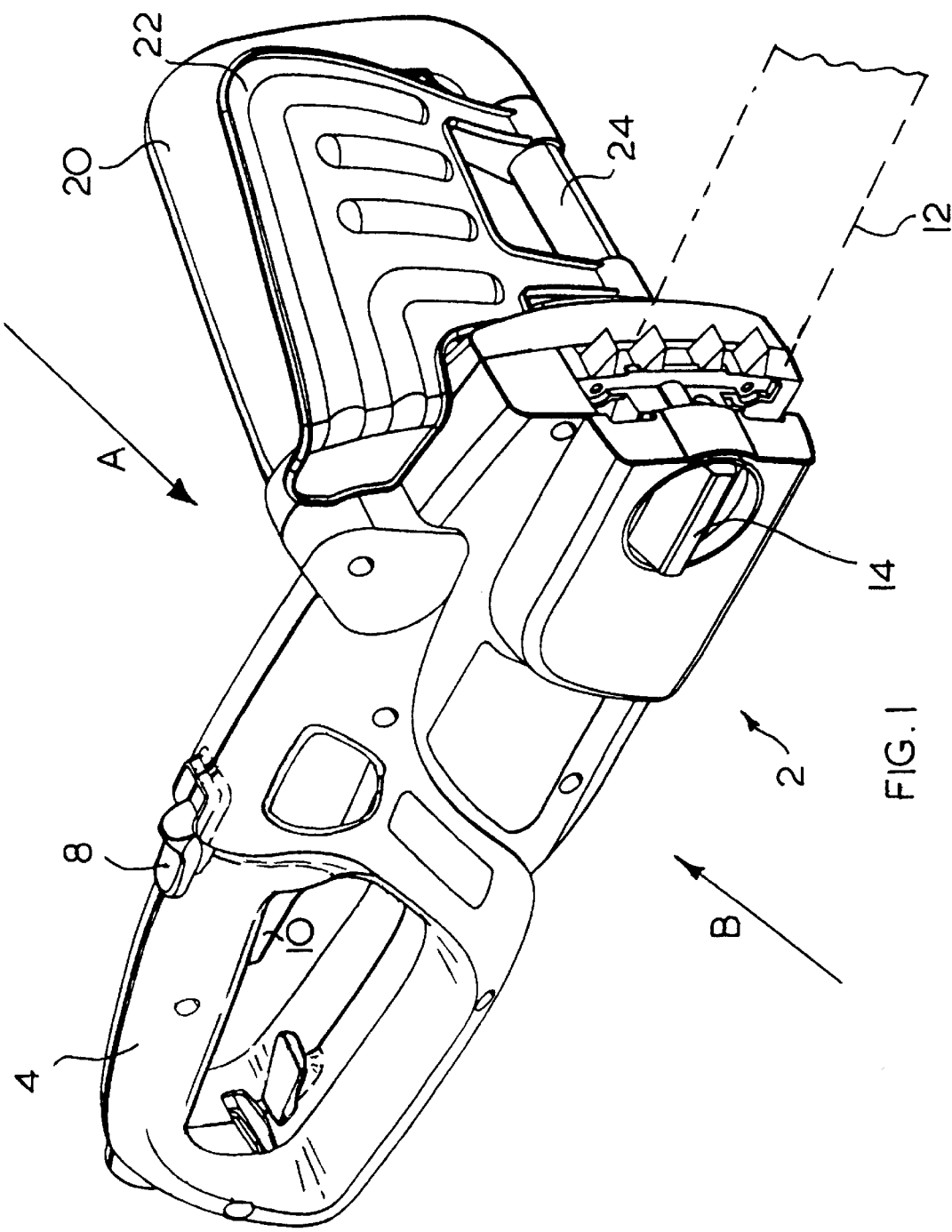
FIG. 1 shows a perspective view of a chain saw (excluding the chain bar and chain)
Figure 2:
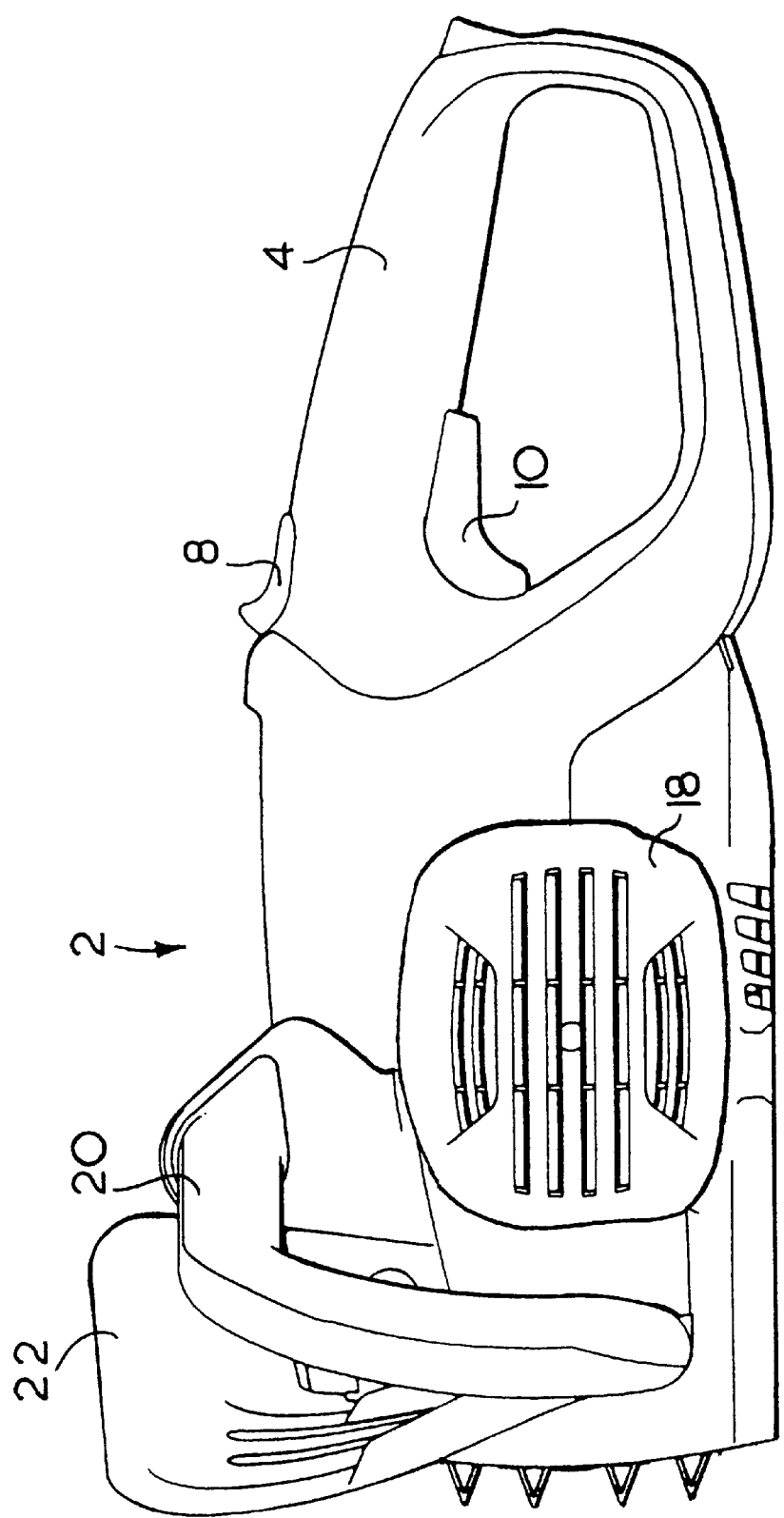
FIG. 2 shows a side view of a chain saw as seen from the side generally indicated by Arrow A in FIG. 1.
Figure 3:
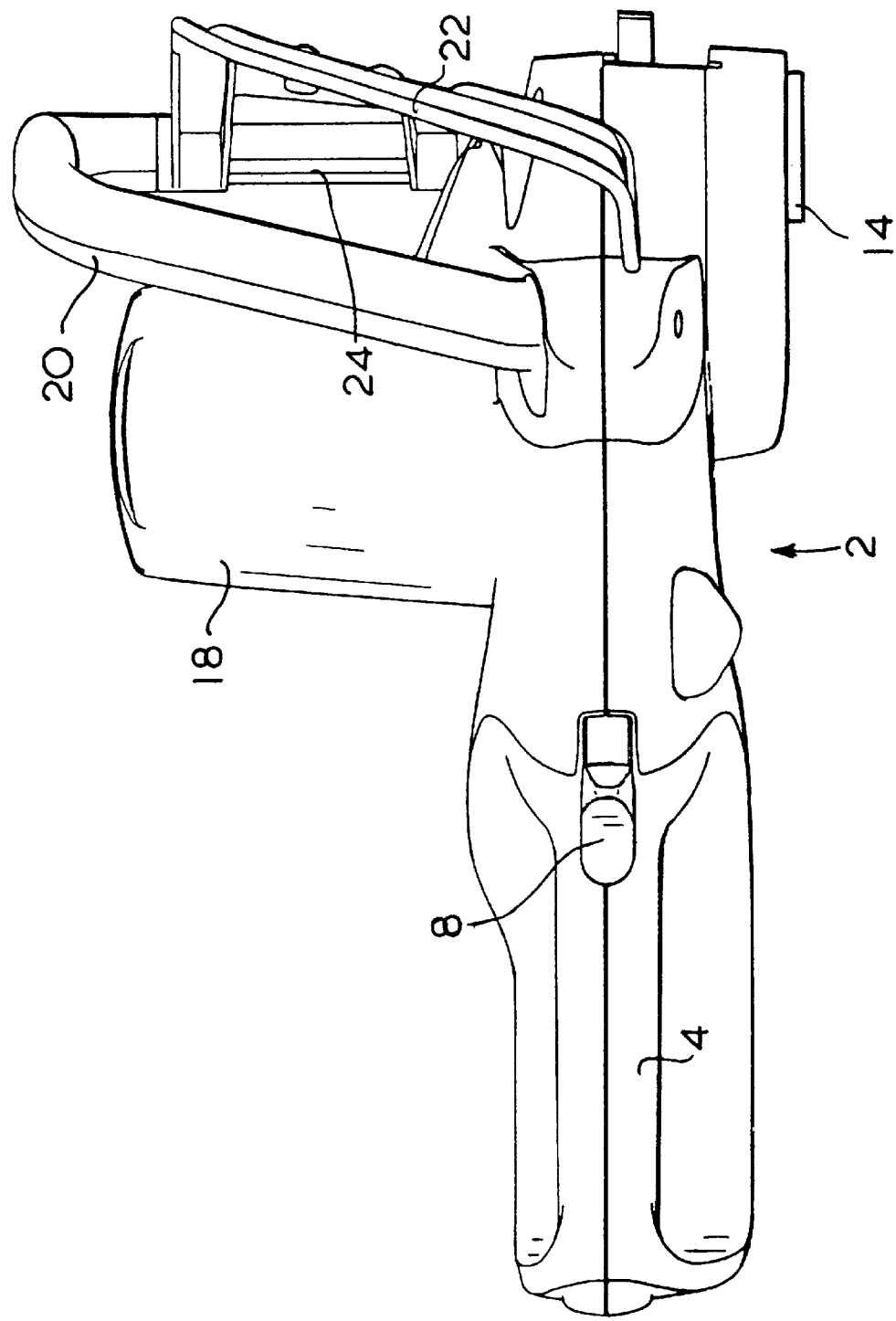
FIG. 3 shows a top view of a chain saw.
Figure 4:
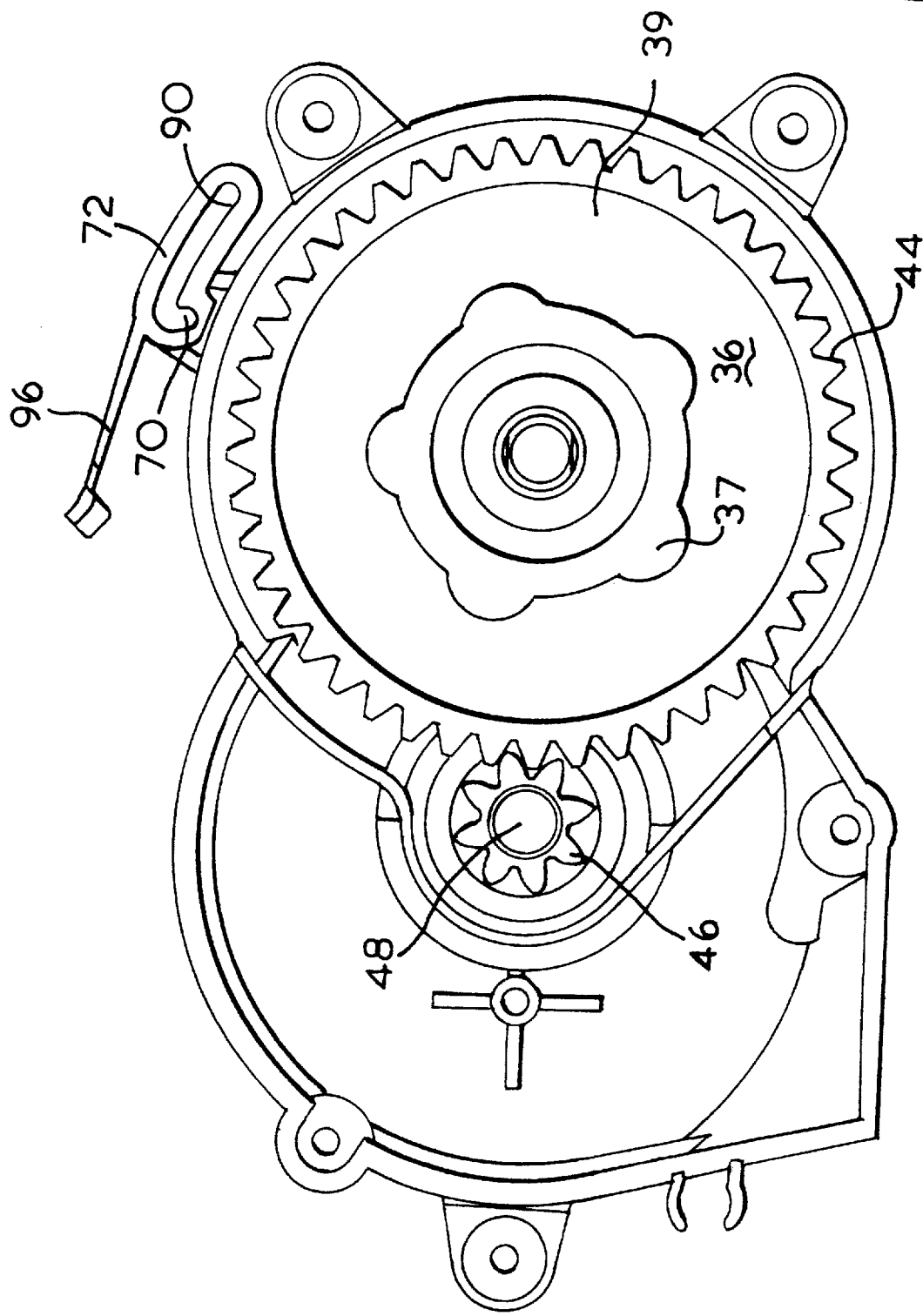
FIG. 4 shows a side view of the dog clutch when it is engaged.

Referring to FIGS. 1 to 3, the chain saw comprises a central body portion (generally indicated by reference number (2)) having a rear handle (4) attached to the rear of the central body portion (2), a sliding switch (8) mounted on the top of the rear handle (4), a trigger switch (10) mounted in the central aperture formed by the rear handle (4), a chain tensioner (not shown) which moves a chain bar (12) (indicated by the dashed lines in FIG. 1) to tighten a cutting chain (not shown) which runs around the chain bar (12) in a known way and which is operated by the rotation of a knob (14), an electric motor (not shown) which drives the chain saw and which is housed in a hood (18), a front bail handle (20) attached to the side of the central body portion (2) in front of the hood (18) and a pivotal handle guard (22) which pivots about the base portion (24) of the front bail handle (20) about a substantially horizontal axis of pivot.

In use the electric motor drives the chain of the chain saw via a clutch mechanism. The electric motor rotatingly drives the clutch mechanism which, when engaged, rotatingly drives a sprocket (not shown) around which is wrapped part of the chain. When the clutch mechanism is disengaged, the sprocket and therefore the chain remain stationary regardless of whether the motor is running or not. The clutch mechanism is biased by a spring (26) towards the disengaged position. The clutch mechanism is engaged or disengaged by the movement of the sliding switch (8) which is linked mechanically to the clutch mechanism. The clutch mechanism is engaged by sliding the sliding switch (8) forward to a forward position and disengaged by allowing the sliding switch to slide back due to a biasing force to a rearward position. The sliding switch (8) is further configured so that the trigger switch (10) cannot be depressed, thereby preventing the flow of electrical current to the electric motor, until the sliding switch (8) is in the forward position.

Figure 17:
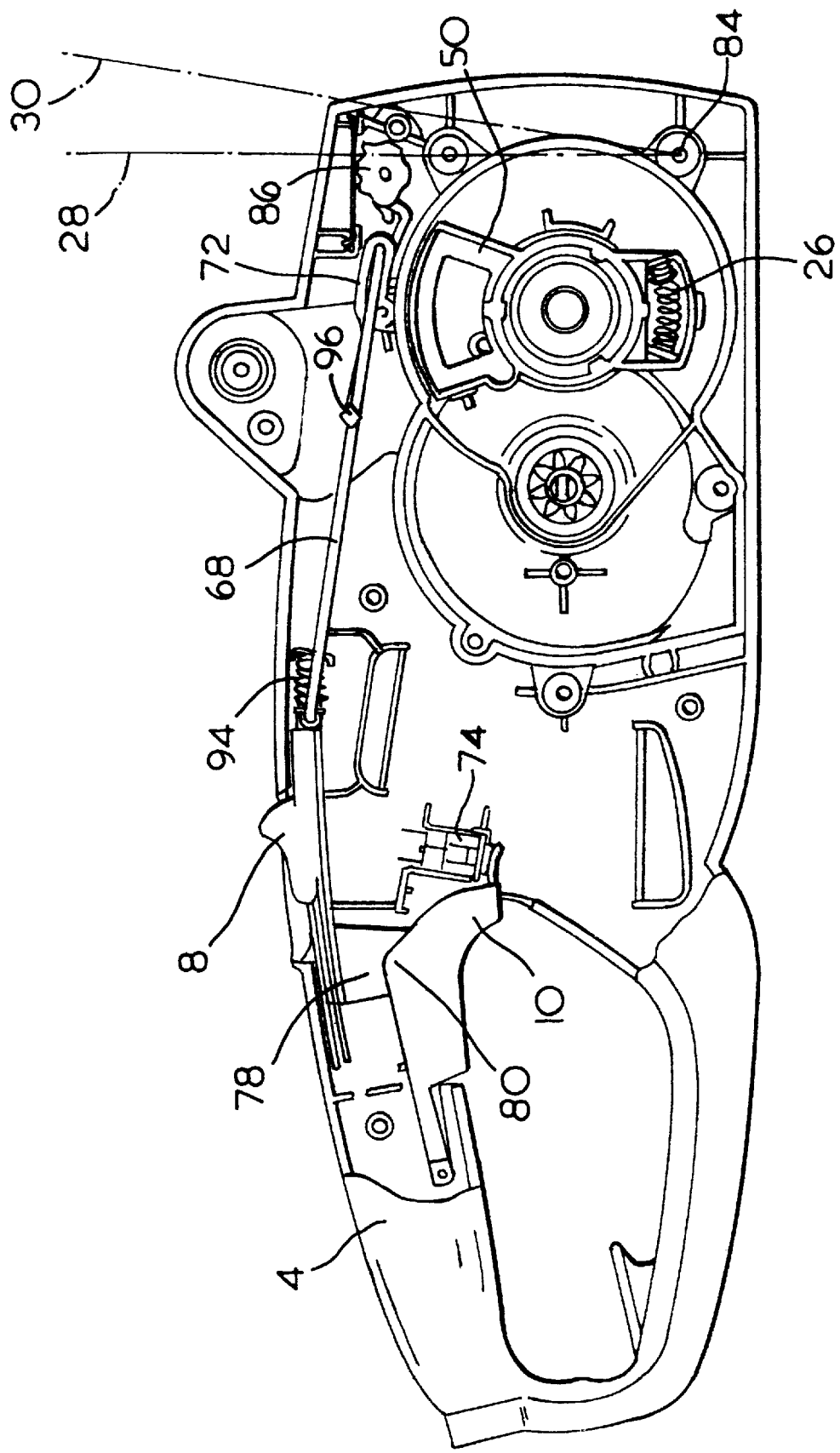
FIGS. 17 shows a schematic design of a vertical cross-section of the chain saw in the plane of the gear actuator with the dog clutch disengaged due to the activation of the pivotal handle guard when viewed from the side of the chain saw in a direction generally indicated by Arrow B in FIG. 1.

The clutch mechanism is further linked to the pivotal handle guard (22). During the normal course of operation of the chain saw the pivotal handle guard (22) remains in a rear position (indicated by line 28 in FIGS. 10, 11 and 17) towards the bail handle (20). Whilst the pivotal handle guard (22) is in this position, it has no interaction with the clutch mechanism thereby allowing the normal operation of the clutch mechanism and hence chain saw. However, when the pivotal handle guard (22) is pivoted to a forward position (indicated by line 30), the movement disengages the sliding switch (8) from the clutch mechanism thereby allowing the clutch mechanism to disengage due to the biasing force of the spring (21). The forward pivotal movement of the pivotal handle guard (22) most often occurs when the chain saw "kicks back" whilst being used. When this occurs, the back of the hand of the operator holding the front bail handle (20) will make contact with and push the pivotal handle guard (22) forward, causing it to pivot to the forward position (30). The pivotal movement of the pivotal handle guard (22) will disengage the clutch mechanism allowing the chain to run to a stop even while the motor continues to rotate.

The construction of the clutch mechanism together with the means by which it interacts with the sliding switch (8) and pivotal handle guard (22) will now be described in greater detail.

Figure 12:
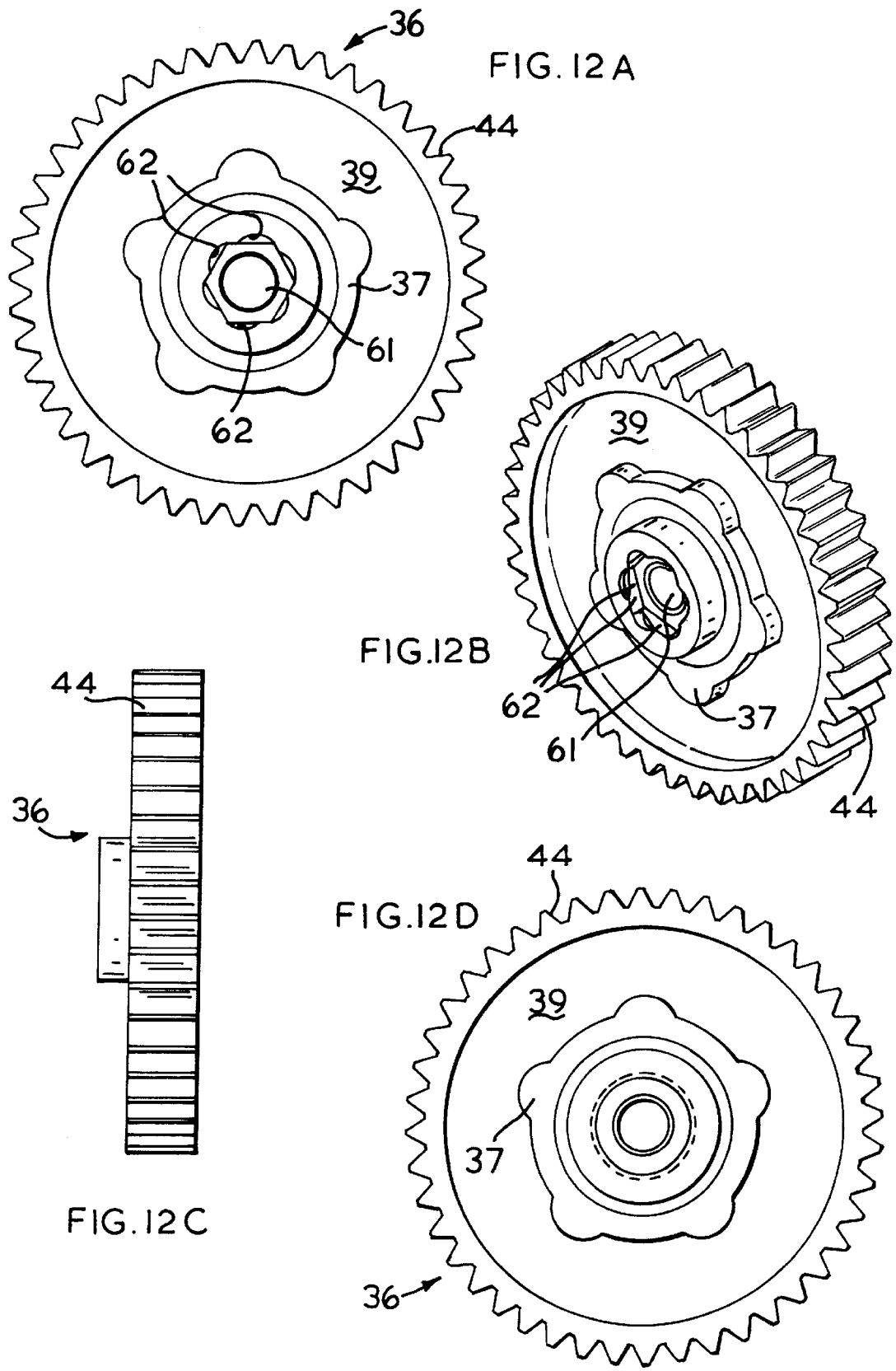
FIGS. 12A to 12D show design drawings of the drive gear.
Figure 13:
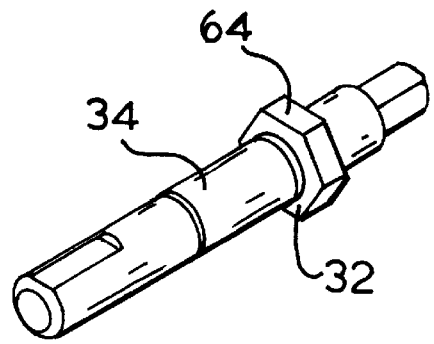
FIGS. 13A to 13B show design drawings of the driven gear rigidly mounted on the driven spindle.
Figure 13:
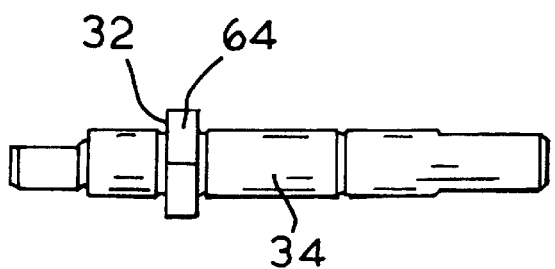
Figure 16:
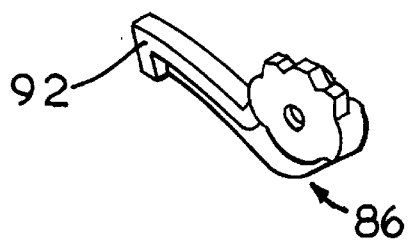
FIGS. 16A to 16B show design drawings of the guard actuator.
Figure 16:
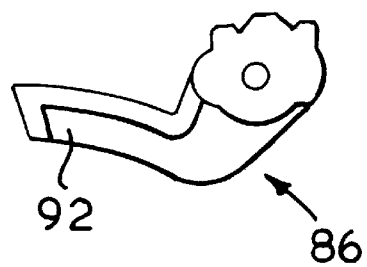
Figure 14A:
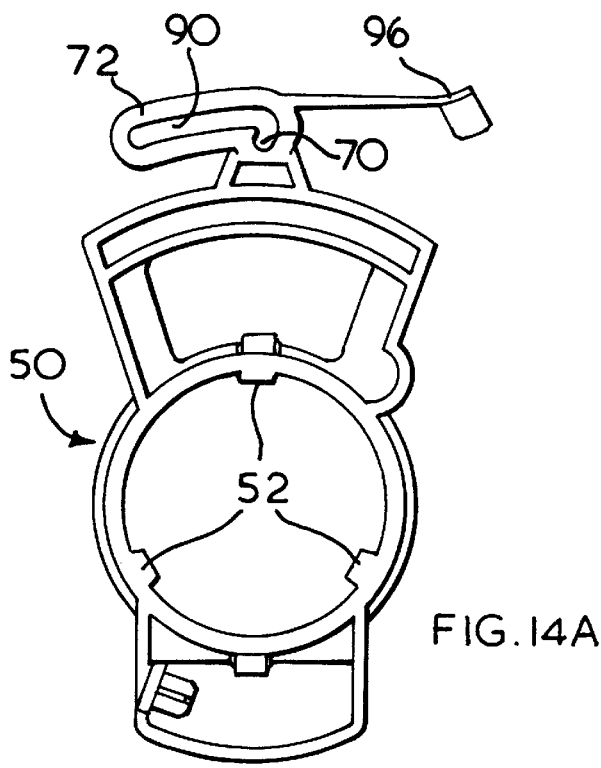
FIGS. 14A to 14D show design drawings of the gear actuator.
Figure 14B:
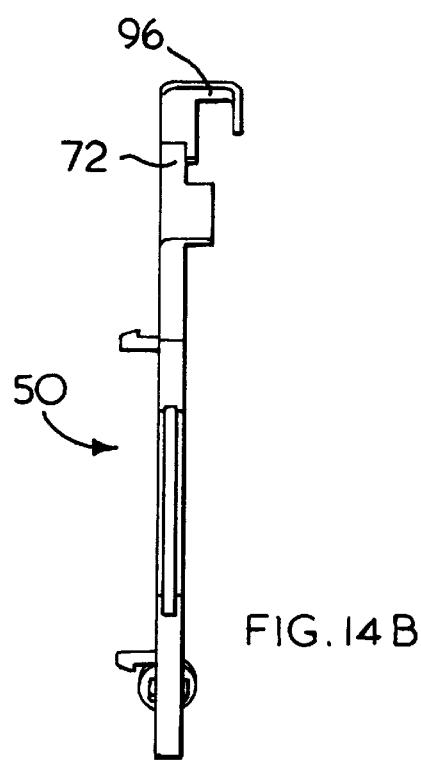
Figure 14C:
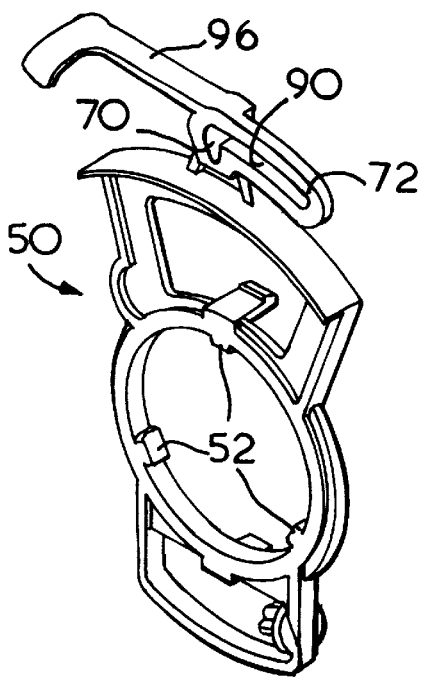
Figure 14D:
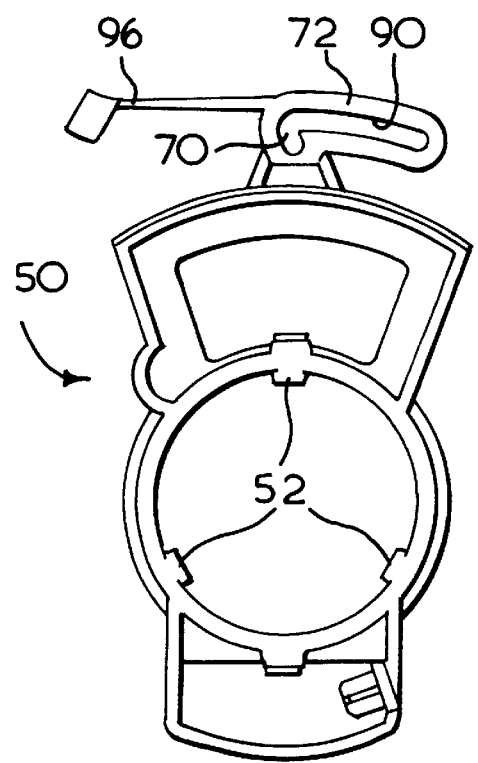
Figure 15A:
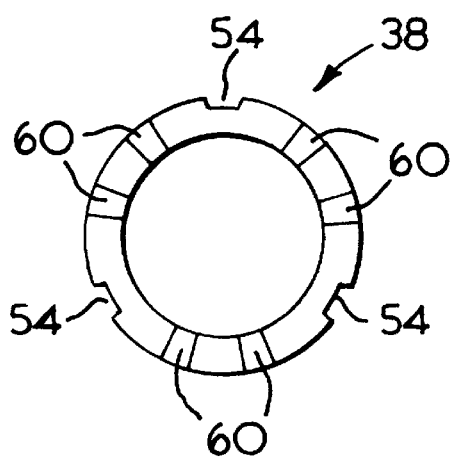
FIGS. 15A to 15D show design drawings of the cam ring.
Figure 15B:
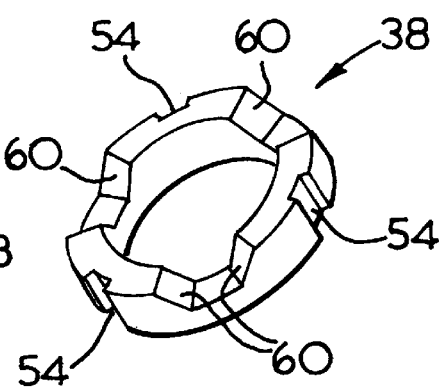
Figure 15C:
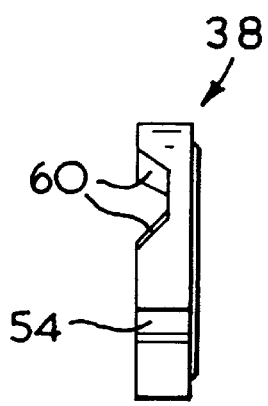
Figure 15D:
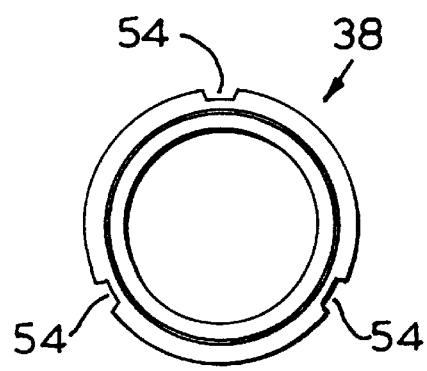

With reference to FIGS. 4 to 9, the clutch mechanism is of the dog clutch variety and comprises a first driven gear (32) which is mounted on and rigidly attached to a rotatably mounted driven spindle (34), a second drive gear (36) which is rotatably mounted on and axially slidable along the driven spindle (34) adjacent to the driven gear (32) and a cam ring (38) which is rotatably mounted within a limited range of rotation about the drive gear (36). FIG. 12 shows a detailed design drawing of the drive gear (36). The drive gear (36) is manufactured from two component parts, an inner part (37) around which is formed an outer cog wheel (39). FIG. 13 shows a detailed drawing of the driven gear (32) mounted of the driven spindle (34) and FIG. 15 shows a detailed design drawing of the cam ring (38). The drive gear (36) is biased towards the driven gear (32) by a spring (40) which is located between the drive gear (36) and a wall (42) of the casing for the dog clutch. The outer circumference (44) of the drive gear (36) meshes with a gear (46) rigidly mounted on a rotatable drive spindle (48) of the electric motor. As the drive spindle (48) rotates about its axis, the gear (46) rotates which in turn causes the drive gear (36) to rotate. The sprocket is mounted on the driven spindle (34) which drives the chain of the chain saw (not shown).

Figure 5:
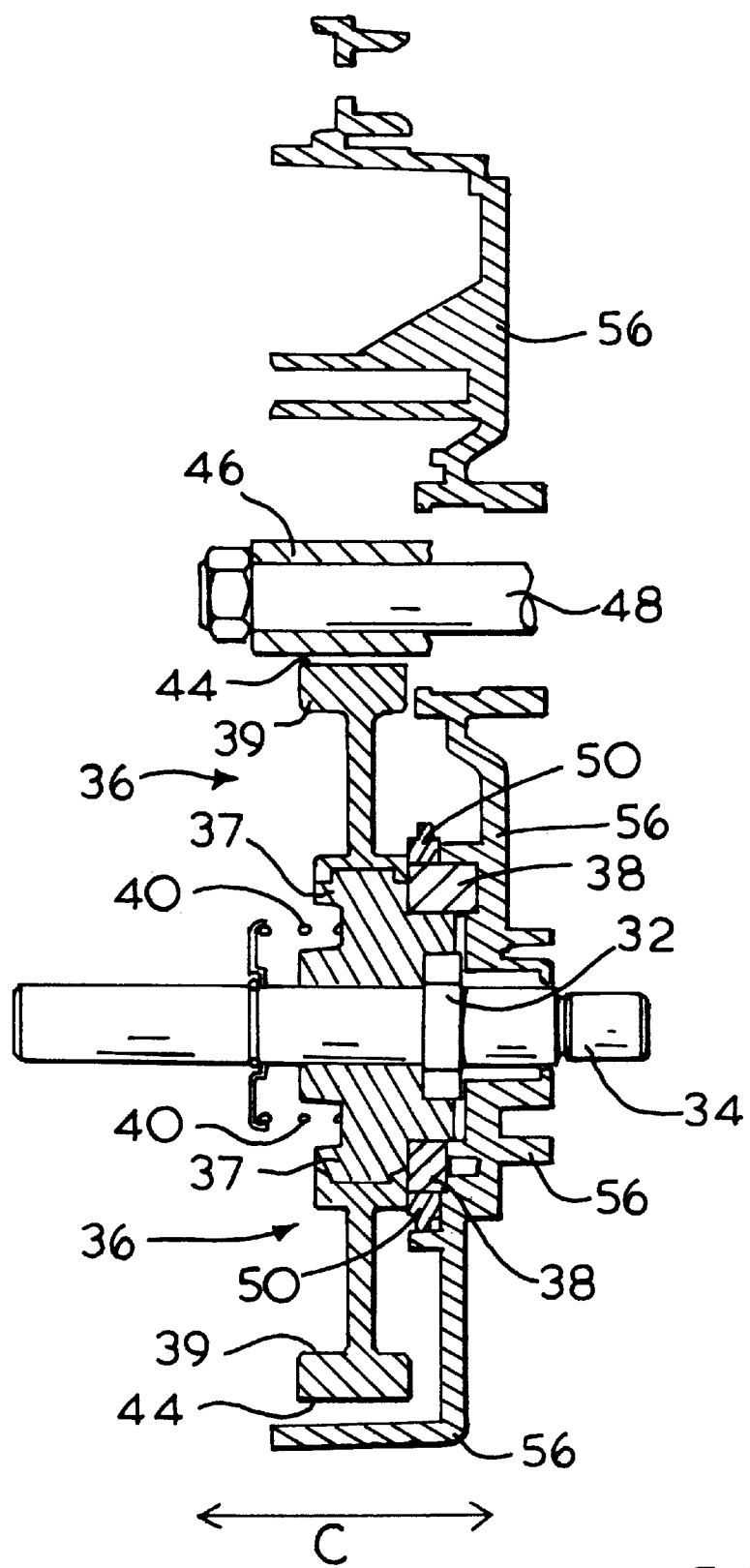
FIG. 5 shows a horizontal cross-section through the longitudinal axis of the driven spindle of the dog clutch when it is engaged by movement of the sliding switch.
Figure 7:
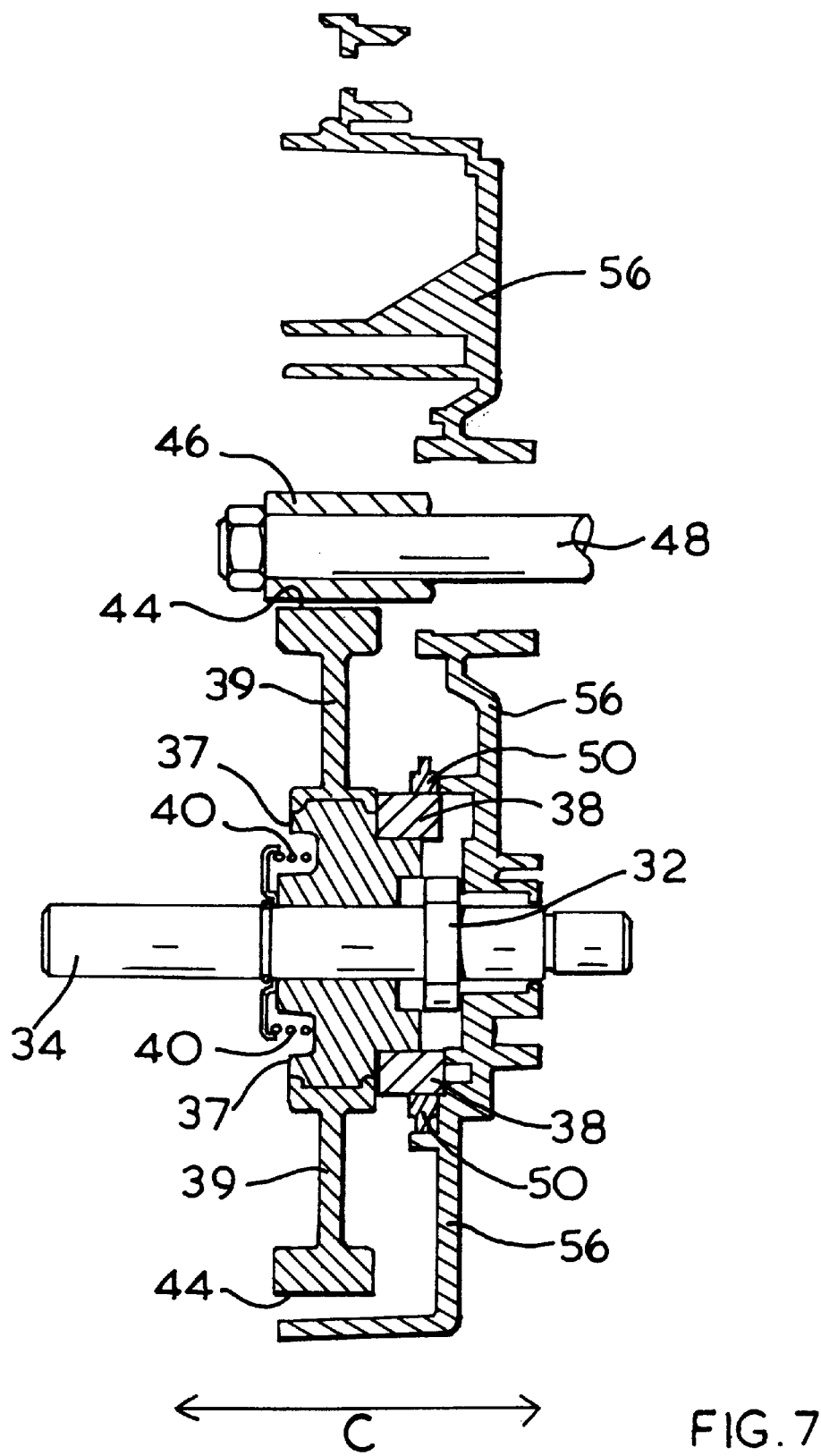
FIG. 7 shows a horizontal cross-section through the longitudinal axis of the driven spindle of the dog clutch when it is disengaged by movement of the sliding switch.
Figure 8:
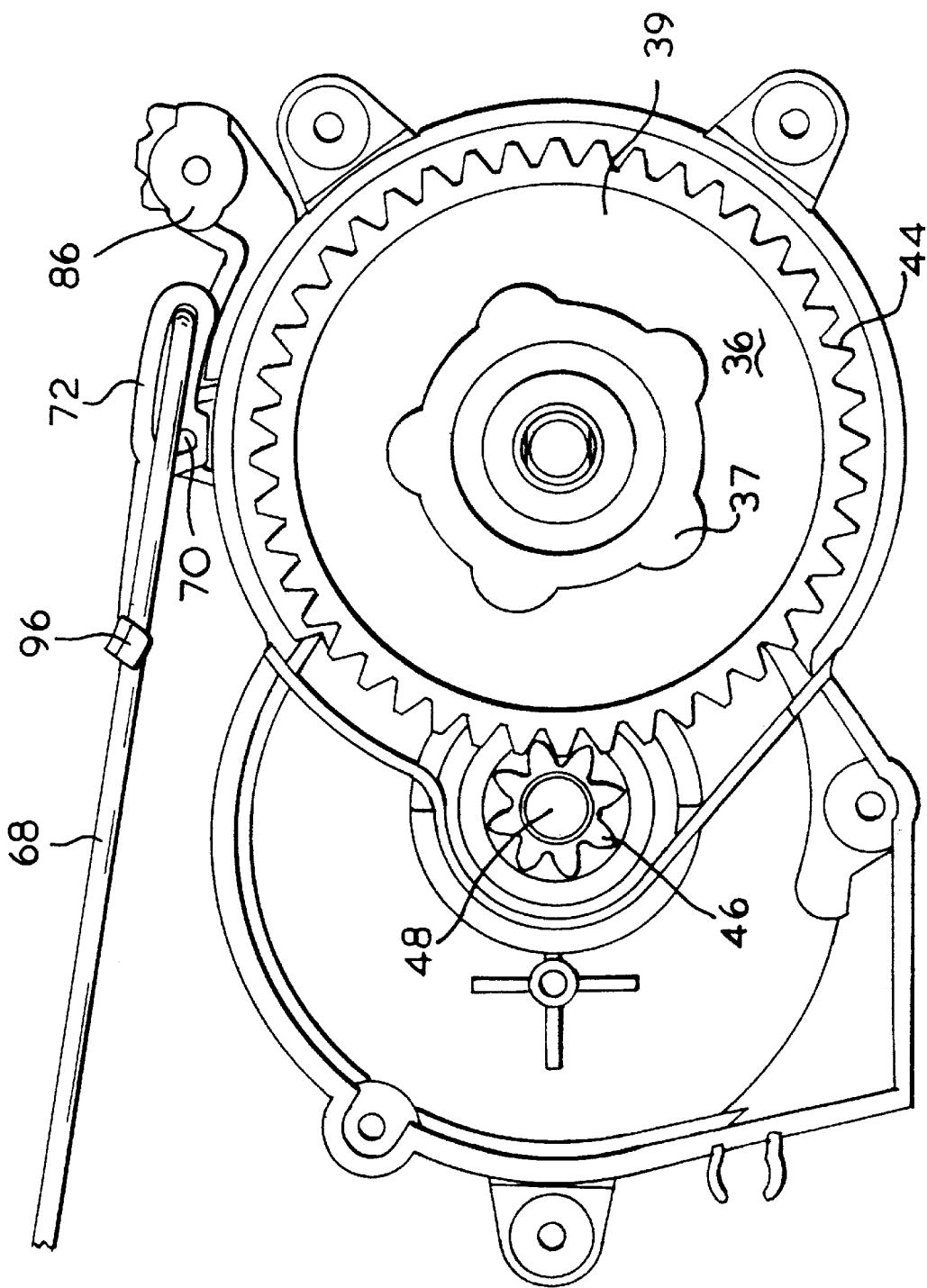
FIG. 8 shows a side view of the dog clutch when it has been disengaged by the movement of the pivotal handle guard together with the metal rod for engaging the dog clutch.
Figure 9:
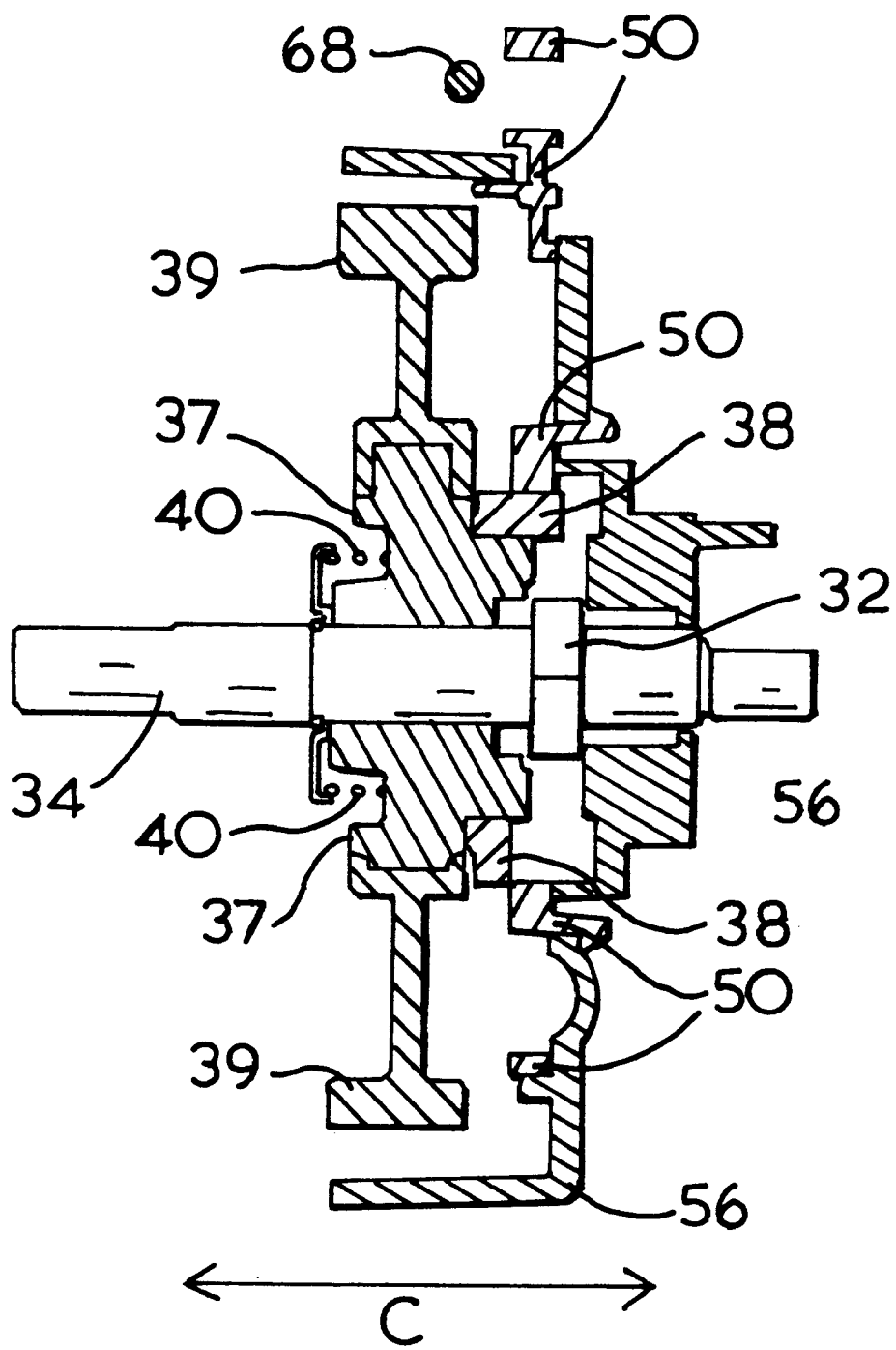
FIG. 9 shows a vertical cross-section through the longitudinal axis of the driven spindle of the dog clutch when it is disengaged by movement of the pivotal handle guard.
Figure 10:
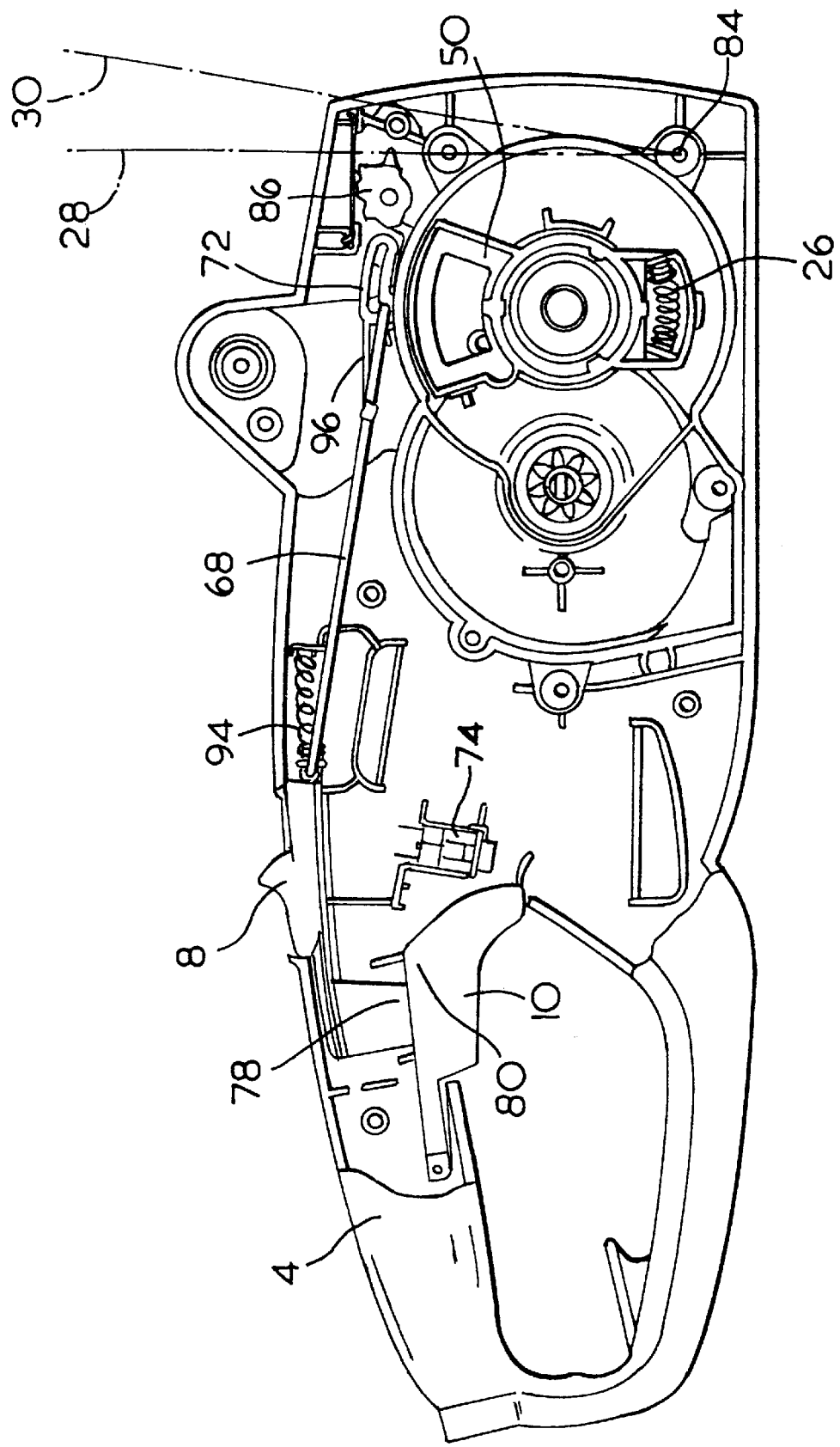
FIG. 10 shows a schematic diagram of a vertical cross-section of the chain saw in the plane of the gear actuator with the dog clutch disengaged when viewed from the side of the chain saw in a direction generally indicated by Arrow B in FIG. 1.
Figure 11:
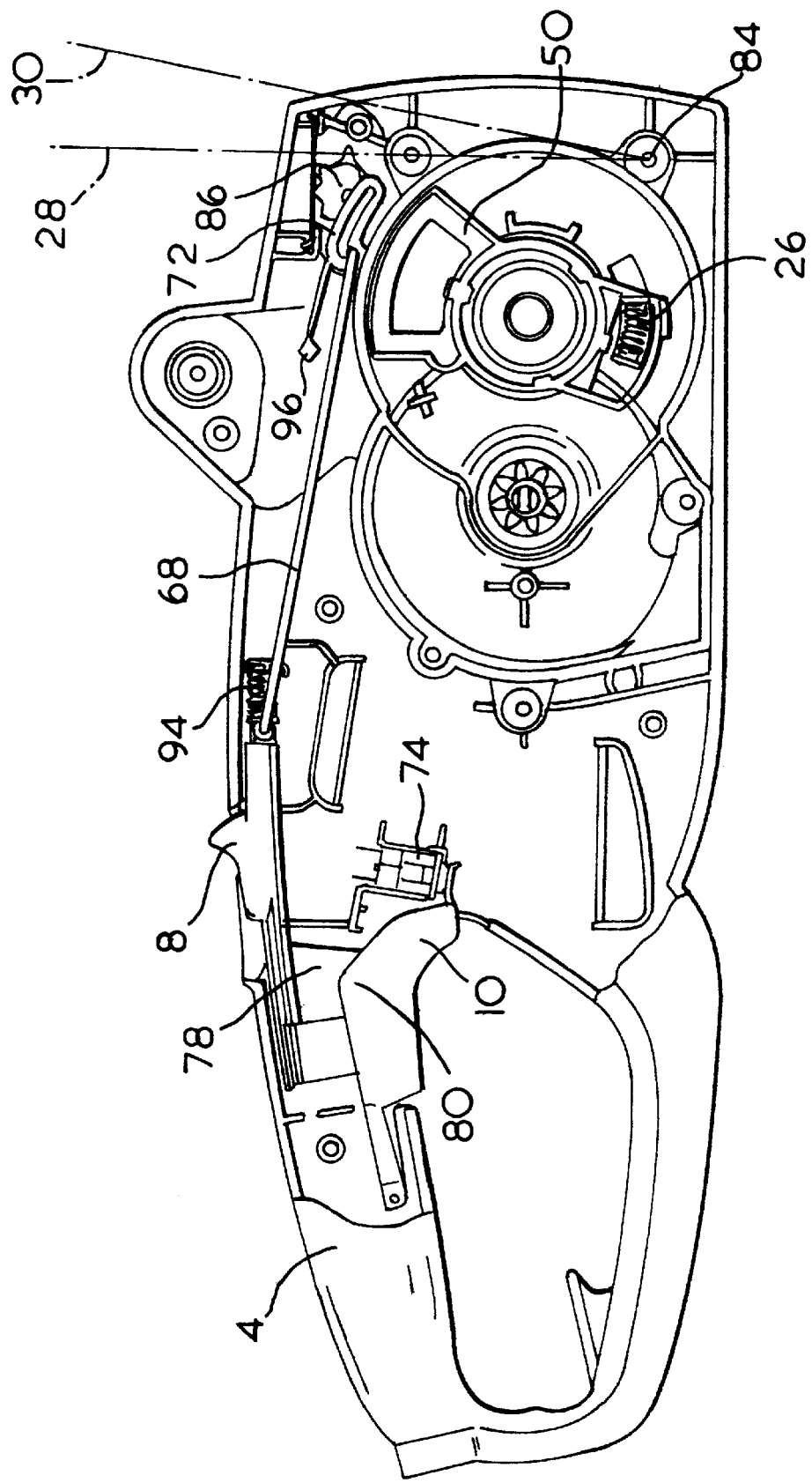
FIG. 11 shows a schematic diagram of a vertical cross-section of the chain saw in the plane of the gear actuator with the dog clutch engaged when viewed from the side of the chain saw in a direction generally indicated by Arrow B in FIG. 1.

The cam ring (38) is mounted within a gear actuator (50) as shown more clearly in FIGS. 10 and 11. FIG. 14 shows a detailed design drawing for the gear actuator (50). Three teeth (52) on the gear actuator (50) project into three corresponding slots (54) on the cam ring (38) so that the gear actuator (50) and the cam ring (38) pivot in unison. The cam ring (38) is able to slide axially within the gear actuator (50) in the direction indicated by Arrow C shown in FIGS. 5, 7 and 9. The drive gear (36), which is biased towards the driven gear (32) by the spring (40), biases the cam ring (38) towards a wall (56) of the casing of the dog clutch. Mounted on the wall (56) in the zone where the cam ring (38) makes contact with the wall (56) are a plurality of ramps which mesh with a set of corresponding ramps (60) on a side of the cam ring (38). The biasing force of the drive gear (36) on the cam ring (38) biases the ramps (60) towards full engagement as shown in FIG. 5. As the cam ring (38) rotates, the ramps (60) on the side of the cam ring (38) ride up the ramps on the wall (56) and force the cam ring (38) to axially slide away from the wall (56) against the biasing force of the drive gear (36) as shown in FIGS. 7 and 9. This in turn forces the drive gear (36) to axially slide along the driven spindle (34) against the biasing force of the spring (40) away from the driven gear (32).

On the side of the drive gear (36) which makes contact with the driven gear (36) is a recess (61) which comprises a plurality of ramped dogs (62) which mesh with the corresponding peripheral surface (64) on the driven gear (32). FIG. 12 and FIG. 13 show the drive gear (36) and the driven gear (32) respectively in detail. When the drive gear (36) is fully biased by the spring (40) towards the driven gear (32), the ramped dogs (62) on the drive gear (36) mesh with the peripheral surface (64) on the driven gear (32) as indicated in FIG. 5. When the drive gear (36) is forced to slide axially away from the driven gear (32) by the rotating action of the cam ring (38), the ramped dogs (62) on the drive gear (36) and the peripheral surface (64) on the driven gear (32) become disengaged as indicated in FIG. 7. The drive gear (36) is able to rotatingly drive the driven gear (32), and hence the driven spindle (34), via the ramped dogs (62) and peripheral surface (64) when they mesh together. When the ramped dogs (62) on the drive gear (36) are disengaged from the peripheral surface (64) on the driven gear (32), the drive gear (36) is able to freely rotate around the driven spindle (34). Ramped dogs (as opposed to teeth or castellations) have been used on the drive gear (36) so that, if they engage with the peripheral surface (64) of the driven gear (32) when they are not aligned, as the drive gear (36) is rotated, the ramped dogs will slide smoothly into alignment and then mesh with the peripheral surface (64).

The shape of the gear actuator (50) is shown in FIG. 14. A spring (26) (shown in FIGS. 10, 11 and 17) biases the gear actuator (50) and hence the cam ring (38) to rotate in an anti-clockwise direction to cause the ramps (60) on the cam ring (38) to ride up the ramps on the wall (56) of the casing to their fullest extent, disengaging the ramped dogs (62) on the drive gear (36) from the peripheral surface (64) of the driven gear (32). The biasing force of the spring (26) is sufficient to override the biasing force of the spring (40) biasing the drive gear (36) against the driven gear (32).

The gear actuator (50) is manually pivoted against the biasing force of the spring (26) by a user sliding a sliding switch (8) mounted on the top of the rear handle (4) of the chain saw. The sliding switch (8) is connected to the gear actuator (50) via a metal rod (68) which connects with a groove (70) in the top (72) of the gear actuator (50). When the chain saw is not in use, the sliding switch (8) is biased towards the rear of the rear handle (4) by the gear actuator (50) via the metal rod (68) due to the biasing force of the spring (26), as shown in FIG. 10. When a user slides the sliding switch (8) forward, the gear actuator (50) and hence the cam ring (38) pivot against the biasing force of the spring (26) as shown in FIG. 11.

Thus the user can engage the drive gear (36) with the driven gear (32) by sliding the sliding switch (8) forward. The trigger switch (10) is pivotably mounted on the inside of the handle (4). The trigger switch (10) activates the electrical power supply to the electric motor (16) by engaging an electrical switch (74). A spring (not shown) biases the trigger switch (10) away from the electrical switch (74). When the trigger switch (10) is depressed by the user, the end (76) of the trigger switch (10) engages the electrical switch (74) as shown in FIG. 11.

The sliding switch (8) and the trigger switch (10) are configured so that they interact with each other. When the chain saw is not being used, the trigger switch (10) is biased away from the electrical switch (74) and the sliding switch (8) is biased towards the rear of the rear handle (4) of the chain saw, as shown in FIG. 10. When the sliding switch (8) is in its rest position (FIG. 10) a ledge (78) of the sliding switch (8) abuts ledge (80) of the trigger switch (10) and hence prevents the trigger switch (10) from being depressed to actuate the electrical switch (74). The sliding switch (8) has to be moved forwards, for the ledge (78) to be removed from the path of the ledge (80) in order for a user to activate the electrical switch (74) by depressing the trigger switch (10), as shown in FIG. 11. When the trigger switch (10) is depressed, the front (82) of the ledge (80) moves into the path of the ledge (78) of the sliding switch (8) and thus prevents the sliding switch (8) from sliding back whilst the trigger switch (10) is depressed. This arrangement ensures that a user engages the dog clutch using the sliding switch (8) prior to applying electrical power to the electric motor (16) using the trigger switch (10).

The dog clutch is designed to interact with a pivotal handle guard (22) which is mounted on the front bail handle

(20) of the chain saw. The handle guard (22) pivots about a point (84) between two positions indicated by the two lines (28) and (30). The axis of pivot which projects perpendicularly to the plane of drawings of FIGS. 10, 11 and 17 through point (84) of the handle guard (22) is parallel to that of the driven spindle (34). The handle guard (22) is a safety feature of the chain saw. In normal use, the handle guard (22) is positioned in the position indicated by the line (28). During the normal operation of the chain saw, the handle guard remains in this position at all times. However, sometimes the chain saw, in use, will "kick back". When this happens, the blade of the chain saw is thrown vertically upwards towards the head of the user. During "kick-back" the chain saw's acceleration is very great and either the inertia of the handle guard (22) or the back of the hand of the user holding the bail handle (30) hits the pivotal handle guard (22 causes it to pivot to the position indicated by the line (30). The dog clutch is configured so that the pivotal movement of the pivotal handle guard (22) from position (28) to (30) causes the dog clutch to disengage the chain from the electric motor and hence to stop the chain regardless of the position of the sliding switch (8).

Figure 6:
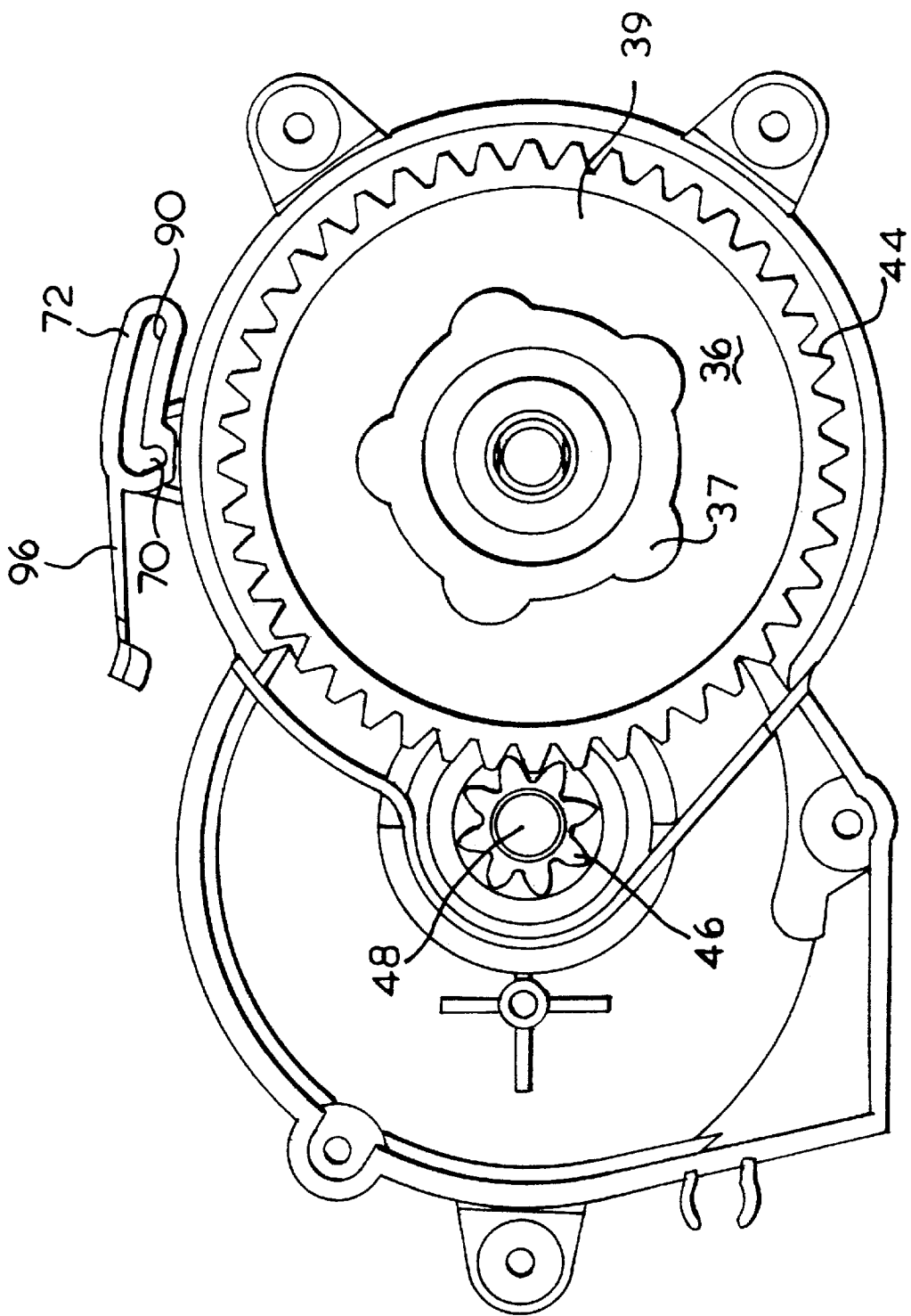
FIG. 6 shows a side view of the dog clutch when it is disengaged.

A guard actuator (86) is rigidly attached to the handle guard (22). The shape of the guard actuator (86) is shown in FIG. 9. The end of the metal rod (68) is bent at 90° to form a peg which sits in and passes through the groove (70) of the gear actuator (50). Above the groove (70) is a slot (90) which communicates with the groove (70). In normal operation the peg remains in the groove (70). The peg passes through the groove (70) and projects outwardly to the side of the gear actuator (50) as shown in FIG. 6. An arm (92) of the guard actuator (86) is positioned below the peg during normal use. During normal use of the chain saw the gear actuator (50) is pivoted under the action of the metal rod (68). When the handle guard (22) pivots due to a "kick back", the guard actuator (86) moves about the point (84). As it does so, the arm (92) of the guard actuator (86) knocks the peg out of the groove (70) and into the slot (90) as shown in FIG. 11. The gear actuator (50) pivots back under the biasing action of the spring (40), the peg sliding along the slot (90) as it does so. The pivoting action of the gear actuator (50) causes the dog clutch to become disengaged, this disengages the drive to the chain which will soon run down to a stop. This is a safety feature which brakes the chain when kick back occurs.

When the user releases the trigger switch (10), the sliding switch (8) is able to slide back. As the end of the metal rod (68) is disengaged from the groove (70), the biasing action of the spring (26) is unable to return the sliding switch (8) to its starting position. Therefore, a biasing spring (94) has been attached to the sliding switch (8) to force the sliding switch (8) and metal rod (68) back to its starting position. As the sliding switch (8) slides back towards the rear of the rear handle (4), the peg formed by the metal rod (68) slides along the slot (90) but is prevented from falling into the groove (70) by the arm (92). A spring (96) is formed integral with the gear actuator (50). The spring (96) makes contact with and biases the metal rod (68) towards the driven spindle 34) when the dog clutch is disengaged so that the peg (88) is biased into the groove (70) regardless of the orientation of the chain saw. Whilst the handle guard (32) is in a position indicated by line (30) the gear actuator (50) is prevented from pivoting in response to movement of the sliding switch (8) because the peg is blocked by the arm (92) of the guard actuator (86). Therefore, the pivotal handle guard (22) has to be returned to the position indicated by line (28) so that it is below the level of the groove (70) so that the peg formed by the metal rod (68) can fall back into the groove (70) under the action of the spring (96). Only when the handle guard has been set in position (28) can the clutch be engaged using the sliding switch (8) in order to drive the chain.

What is claimed is:

1. A dog clutch mechanism for a power tool, the dog clutch mechanism comprising:
   a fixed wall;
   a rotatable spindle;
   a first gear mounted on and attached to the rotatable spindle;
   a second gear rotatably mounted adjacent the first gear, wherein the second gear is axially slidable along the spindle and is biased toward the first gear; and
   an engaging mechanism positioned on the spindle adjacent the second gear and rotatably mounted around and axially slidable along a longitudinal axis of the spindle,
   the engaging mechanism comprising a single cam ring having a plurality of cam surfaces, rotation of the cam ring results in the cam surfaces engaging the fixed wall to translate rotational movement of the cam ring into axial sliding movement of the cam ring along the spindle.

2. The dog clutch of claim 1, wherein the engaging mechanism is rotatably mounted on the second gear.

3. The dog clutch of claim 1, wherein the second gear is biased towards the first gear by a resilient helical spring.

4. The dog clutch of claim 1, further comprising
   a gear actuator pivotal about the longitudinal axis of the spindle,
   the engaging mechanism non-rotatably mounted with respect to the gear actuator and axially slidable relative to the gear actuator, the engaging mechanism axially slidable along the longitudinal axis of the spindle and pivotable together with the gear actuator around the longitudinal axis between a first position in which the second gear drivingly engages the first gear and a second position in which the second gear is disengaged from the first gear.

5. The dog clutch of claim 4, wherein the gear actuator is biased towards the second position, the biasing force being sufficient to overcome the force that biases the second gear towards driving engagement with the first gear.

6. The dog clutch of claim 5, wherein the gear actuator is biased towards the second position by a helical spring.

7. The dog clutch of claim 1, wherein the first gear comprises a peripheral outer surface that meshes with a series of ramped dogs on the second gear when the second gear drivingly engages the first gear.

8. A dog clutch for a power tool, the dog clutch comprising:
   a first gear mounted on and attached to a rotatable spindle;
   a second gear rotatably mounted adjacent the first gear, wherein the second gear is axially slidable along the spindle and is biased toward the first gear; and
   an engaging mechanism rotatably mounted on the spindle adjacent the second gear, the engaging mechanism being axially slidable along a longitudinal axis of the spindle and configured so that rotational movement of the engaging mechanism translates into an axial sliding movement of the engaging mechanism and moves the second gear into and out of driving engagement with the first gear depending upon the direction of rotation, wherein the engaging mechanism is mounted in an axially slidable but non-rotatable fashion within a gear actuator, the gear actuator being capable of pivoting about the longitudinal axis of the spindle between a first position in which the second gear drivingly engages the first gear and a second position in which the second gear is disengaged from the first gear, wherein the gear actuator is biased towards the second position, the biasing force being sufficient to overcome the force that biases the second gear towards driving engagement with the first gear; and wherein the gear actuator is biased towards the second position by a helical spring.

9. A dog clutch mechanism for a power tool, the dog clutch mechanism comprising:

a fixed wall;

a rotatable spindle;

a first gear mounted on and attached to the rotatable spindle;

a second gear rotatably mounted adjacent the first gear, wherein the second gear is axially slidable along the spindle and is biased toward the first gear;

an engaging mechanism positioned on the spindle adjacent the second gear and rotatably mounted around and axially slidable along a longitudinal axis of the spindle; and a gear actuator pivotal about the longitudinal axis of the spindle, the engaging mechanism being non-rotatably mounted with respect to the gear actuator and axially slidable relative to the gear actuator, the engaging mechanism axially slidable along the longitudinal axis of the spindle and pivotable together with the gear actuator around the longitudinal axis between a first position in which the second gear drivingly engages the first gear and a second position in which the second gear is disengaged from the first gear.

10. A dog clutch assembly for a power tool, the dog clutch assembly comprising:

a rotatable spindle;

a first gear mounted on and attached to the rotatable spindle;

a second gear rotatably mounted adjacent the first gear, wherein the second gear is axially slidable along the spindle and is biased toward the first gear;

an engaging means rotatable about and axially slidable around the rotatable spindle and movable between a first position and a second position, the first position for drivingly engaging the second gear with the first gear and the second position for disengaging the second gear from the first gear, the engaging means comprising a movable element having at least one cam surface engageable with a fixed element.

* * * * *